J. B. McCormick,
Hemp Harvester.
No. 17,438.   Patented June 2. 1857.
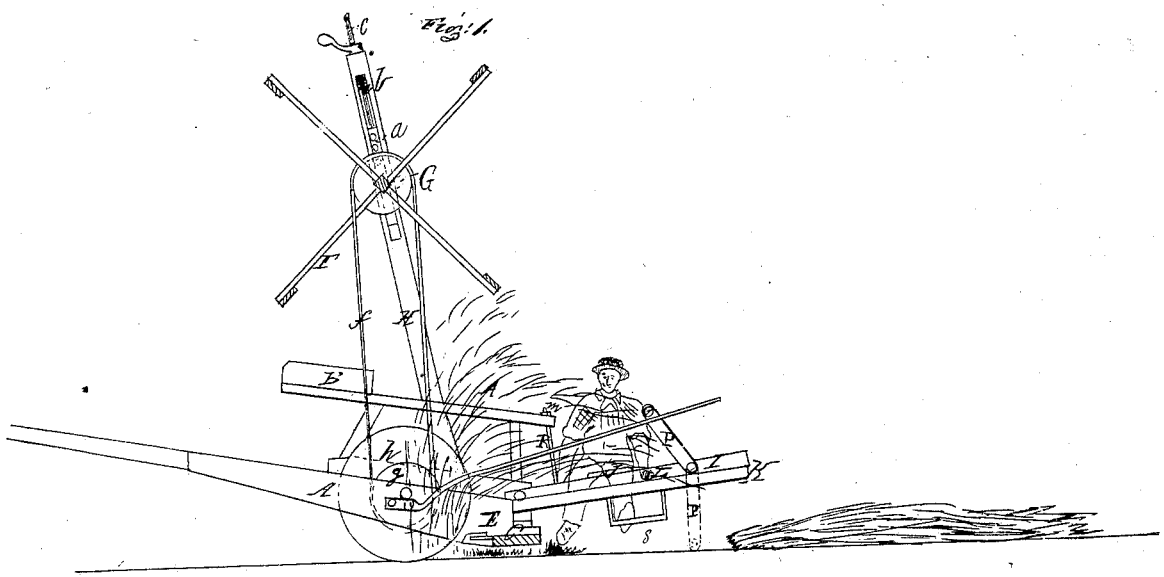
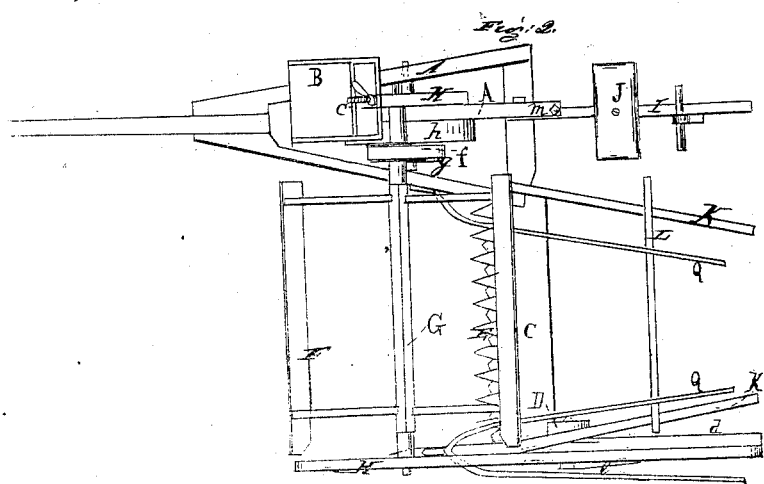

UNITED STATES PATENT OFFICE.

J. B. McCORMICK, OF VERSAILLES, KENTUCKY.

IMPROVEMENT IN MACHINES FOR HARVESTING HEMP.

Specification forming part of Letters Patent No. 17,438, dated June 2, 1857.

*To all whom it may concern:*

Be it known that I, JOHN B. MCCORMICK, of Versailles, in the county of Woodford and State of Kentucky, have invented a new and useful machine for cutting standing hemp and properly spreading or laying the same in gavels or parcels upon the ground; and I do hereby declare that the following is a full, clear, and exact description of the same, reference being had to the annexed drawings, making a part of this specification, in which—

Figure 1 is a longitudinal vertical section of my improvement, the plane of section passing transversely through the center of the sickle or cutter. Fig. 2 is a plan or top view of the same.

Similar letters of reference indicate corresponding parts in the two figures.

To enable those skilled in the art to make and use my invention, I will proceed to describe its construction and operation.

A represents the main frame of a reaper or harvester. B is the driver's seat, attached thereto, and C is a narrow platform, one end of which is attached to the main frame, and the opposite end is supported at a suitable height from the ground by a wheel, D. To the front part of the platform C a sickle or cutting device, E, is attached. The sickle or cutting device may be the same as those usually employed on harvesters, or modified as occasion may require. The above parts are arranged and constructed similarly to the harvesters in common use, and therefore do not require a minute description.

F represents a reel, the shaft G of which has its bearings in shafts H H', attached to the machine. One of the bars, H, is attached to the main frame A, and the bearing $a$ works in a groove or slot, $b$, in said bar, the bearing being raised or lowered by a screw-rod, $c$. The bar H' is pivoted to a bar, $d$, which is connected to the outer end of the platform C, and a brace, $e$, is connected to the bar H', the lower end of said brace being also pivoted to the bar $d$. By adjusting this brace the bar H' may be secured in a greater or less inclined position and the outer bearing of the shaft G of the reel raised or lowered to the desired height. Thus it will be seen that the reel F may be raised or lowered to suit the height of the hemp.

The reel F may be driven by a belt, $f$, from a pulley, $g$, attached to the inner side of the wheel $h$, which supports the main frame A.

To the back part of the main frame A an inclined bar, I, is attached, and on this bar an adjustable seat, J, is placed.

To the back part of the main frame A, and also to the outer end of the platform C, two inclined bars, K K, are attached. Both bars are shown clearly in Fig. 2.

L represents a stick or rod, which is placed upon the bars K K. One or two rods L may be employed.

The operation is as follows: The driver is seated upon the seat B and an attendant is seated upon the seat J. The attendant places the rods L (one or more) upon the bars or supports K K, and as the machine is drawn along the hemp is cut by the sickle E, and the reel F, as fast as it rotates, strikes the upper part of the hemp and throws it over upon the rod or rods L and platform C, the butts or lower ends of the hemp resting upon the platform and the upper ends resting upon the rod or rods L. When a requisite quantity of hemp has fallen upon the platform and rods the attendant suddenly withdraws the rods L, which serve as a movable platfrom, from underneath the hemp and it falls upon the ground. The rods are quickly replaced upon the bars K K and again withdrawn when a sufficient quantity of hemp is placed upon them. The seat J may be adjusted so that the attendant may place himself in proper position to suit the size or length of the stalks of hemp, and sit either facing the falling hemp or with the face backward.

P is a stirrup, which is thrown up when not in use, but hangs down, as shown in dotted lines, for the attendant to rest his feet upon when his position is changed.

Q are guide-rods, which serve to direct and to a certain extent compact or bundle up the cut hemp as it falls upon bar L.

By this improvement the cut hemp is deposited in gavels or parcels upon the ground in the rear of the track of the machine, so that the hemp may be readily spread out upon the surface of the ground.

The bar I is adjustable vertically by means of the rod R, the lower end of which is attached to bar I, while the upper end passes up through a portion of the frame A. The upper end of rod R has a screw-thread cut upon it, and is provided with a nut, $m$, by turning which the rod R, and with it bar I, is raised or lowered.

I would here remark that the seat J is differently situated from the seat in any other hemp-machine. The operator can change his position at pleasure. He can sit nearer or more remote from the cutting process, and thus accommodate himself to the different lengths of hemp. In laying the hemp he can face the falling hemp, or face with an inclination backward or forward. His feet are sustained by a stirrup, S, on bar K at a convenient distance below his seat, though he can, if he desires, place one foot on the stirrup P and the other on the frame of the machine.

In using the machine it will not do well to draw the rod L out at right angles to the bars K. Such manner of withdrawal would windrow the hemp or put it in a kind of stretch. The far-side hemp would begin to fall first. The operator throws up the end in his hand, thereby more closely compacting the hemp toward the center, and then throws the rod out in a circle. The operator must watch the reel and place his stick in under the wave of the reel.

When we look at a hemp-field it is rarely found of even height. In a field where the hemp generally ranges from eight to ten feet patches or spots will be found as low as five or six feet, sometimes four feet. The reel must be so set that the tallest hemp will not reach the axle of the reel. Then it frequently occurs that the reel does not touch the hemp at all. In such case the operator can reach forward into the hemp and parcel it very handsomely. To do this is an increase of labor, it is true, but it is not generally requisite for more than a rod or two at a time. Again, it sometimes occurs, when the wind is blowing, that the operator has to aid the reel, which, without such aid, would be stopped. It frequently occurs in very tall hemp that the wind throws the falling hemp diagonally across the far side of the machine. The raker can draw in the falling hemp. Hemp cannot be harvested or laid by a machine unless the parts are so arranged that the attendant can readily accommodate himself to a great variety of contingencies.

Having thus described my invention, what I claim as new, and desire to secure by Letters Patent, is—

The combination of the adjustable bar I and seat J with the bars K K, rods Q Q, movable bar L, and narrow platform C, when said parts are arranged in relation to each other to facilitate the harvesting of hemp, as herein described.

J. B. McCORMICK.

Witnesses:
W. TUSCH,
A. R. HAIGHT.